Figure 1:
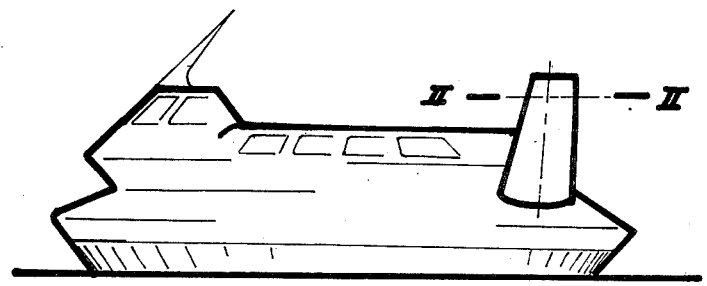

United States Patent [19]

Arborg

[11] 4,192,461
[45] Mar. 11, 1980

[54] PROPELLING NOZZLE FOR MEANS OF TRANSPORT IN AIR OR WATER

[76] Inventor: Ole J. M. Arborg, Mordrupvej 52, DK-3060, Espergaerde, Denmark

[21] Appl. No.: 845,681

[22] Filed: Oct. 26, 1977

[30] Foreign Application Priority Data

Nov. 1, 1976 [DK] Denmark ............................ 4930/76

[51] Int. Cl.² .................... B63H 11/02; B63H 11/12
[52] U.S. Cl. .................... 239/265.17; 239/DIG. 7; 244/52; 417/197
[58] Field of Search .................. 114/151, 166; 115/42; 244/52; 239/265.11, 265.17, DIG. 7; 417/196, 197

[56] References Cited

U.S. PATENT DOCUMENTS

| | | | |
|---|---|---|---|
| 1,964,726 | 7/1934 | Engstrand | 417/197 X |
| 2,157,281 | 5/1939 | Wanda | 239/DIG. 7 X |
| 3,047,208 | 7/1962 | Coanda | 239/DIG. 7 X |
| 3,673,716 | 7/1972 | Trondle | 417/197 X |
| 3,795,367 | 3/1974 | Mocarski | 239/DIG. 7 X |
| 3,885,891 | 5/1975 | Throndson | 417/196 |
| 4,046,492 | 9/1977 | Inglis | 417/197 |

*Primary Examiner*—Robert B. Reeves
*Assistant Examiner*—Andres Kashnikow
*Attorney, Agent, or Firm*—Ladas, Parry, Von Gehr, Goldsmith & Deschamps

[57] ABSTRACT

The invention relates to the propulsion of transport vehicles in air or water, which involves the new use of a nozzle comprising an internal surface, a curved surface merging into the internal surface, a narrowed throat in the internal surface located towards the leading edge of the nozzle, a jacket surrounding the internal surface, an annular internal slot located in the internal surface between the curved surface and the narrowed throat and communicating with the jacket. The fluid under pressure is supplied through the slot the arrangement of the slot being such that the fluid is ejected at an acute angle of under 45° to the direction of the exit flow tangentially to the curved surface.

6 Claims, 7 Drawing Figures

PROPELLING NOZZLE FOR MEANS OF TRANSPORT IN AIR OR WATER

The present invention relates to a propelling nozzle for means of transport and intended to operate in air or water.

Thrust propulsion of means of transport such as hovercraft, aircraft or ships by means of an air or water jet produced by means of a propeller or fan is known. Hereby the whole quantity of air or water passing through is accelerated by the propeller or fan and ejected in a jet where the exit velocity is highest in the central part and lowest in the periphery. Hereby the jet forms a cone of dispersion so that the thrust is reduced by a component at right angles to the axis direction. Furthermore, the propellers generate turbulence around the propeller hubs with a consequent loss of effect. Moreover, air propellers can only be used outside built-up areas due to the high air noise resulting from the movement velocity of the blade tips.

This propelling nozzle is based on the physical effect that a jet is deflected along an adjacent surface which was first observed by Mr. Henri Coanda, a Rumanian engineer, by a test with a jet motor in 1910 and which was named Coanda-effect after him. Heretofore said effect has been rather obscure and has, for all we know, only been used in practice in a so-called wet vacuum cleaner and in a nozzle for the formation of a gas curtain in connection with protective gas welding. No one has previously indicated that advantages could be achieved when utilizing the Coanda-effect in connection with propulsion.

According to the present invention I have found that it is possible to construct a propelling nozzle in which the movement pressure is generated when utilizing the Coanda-effect by converting pressure energy in a small volume flow, which is ejected at a high pressure at an angle with a very big volume flow, into velocity energy in the big volume flow, and that hereby considerable advantages can be achieved over the above mentioned known means of transport.

This is achieved with the propelling nozzle according to the invention which is characterized in that the front of the nozzle wall is carried outwards in a curved surface, and that from a surrounding chamber pressurized air or water is fed into the nozzle through a slot arranged in front of said curved surface in such a way that the medium is ejected tangentially with the curved surface at an angle with the direction of the exit flow.

As a consequence of the Coanda-effect the exit velocity of the medium is highest along the periphery of the nozzle. Hereby it is achieved that the jet maintains its cross section when leaving the nozzle so that the thrust works solely in the axis direction. Furthermore, the ratio of the energy level (pressure and velocity) on the intake side to the energy level (pressure and velocity) on the exit side may be adjusted so as to achieve an ideal ratio of the flow velocity from the nozzle to the velocity of the craft (slip coefficient) resulting in optimum utilization of the energy fed.

The general advantages achieved as a consequence of this are:
that movement pressure in air can be generated with a very big propelling effect at a low noise level;
that fast routes to cities may be serviced by air cushion trains, amphibian hovercraft, STOL-machines, etc.;
that no "open," rotating parts are incorporated in the propelling system;
that the propelling system can work with the same efficiency at different velocities.

The entraining effect on the big volume in the nozzle will be maximum when the medium is ejected from the slot at right angles to the direction of the exit flow, but in that case the surrounding pressure chamber must necessarily have large cross-sectional dimensions in relation to the cross-sectional area of the nozzle. This implies that a nozzle with a suitable thrust pressure for use in for example a hovercraft will be so big that in practice it will be impossible to mount it on the craft, and due to the large projected area in the direction of travel it would cause an undesirably high air resistance.

According to the present invention I have surprisingly found that it is possible to achieve a just as good utilization of energy in a propelling nozzle of the stated type when the medium is ejected from the slot at an acute angle with the direction of the exit flow, and so a particularly preferred embodiment of the propelling nozzle of the invention is characterized in that the slot is arranged in relation to the curved surface in such a way that the medium is ejected at an acute angle with the direction of the exit flow, the inner edge of the slot not protruding inside the narrowest circumference (throat) of the nozzle.

Hereby a drastic reduction of the outer dimensions of the nozzle can be achieved without impairing the internal efficiency of the nozzle so that the nozzle is suitable for practical use.

According to the invention it has proved expedient to design the nozzle so that the fluid is ejected from the slot at an angle with the direction of the exit flow of under 45°.

A practical embodiment of the nozzle according to the invention, which has given excellent results with respect to utilization of the added energy when used in air, is characterized in that the medium is ejected from the slot at an angle with the direction of the exit flow of about 15°.

The outward tapering of the nozzle pipe is also important for the utilization of the added energy to achieve the highest possible thrust pressure in the exit orifice of the nozzle. Under normal Venturi conditions of flow the best results should be expected at a tapering of about 30°, but this applies only for an approximately homogeneous flow of the whole quantity of air. Tests with said embodiment of the nozzle according to the invention have shown that optimum results are achieved when the nozzle exit has an outward tapering of about 7½°.

In the nozzle according to the invention the pressure medium is fed through an annular slot arranged in front of the narrowest circumference (the throat) of the nozzle and outside it, seen in the cross-section of the nozzle. For a given pressure in the surrounding pressure chamber the overall slot area determines the volume flow of the medium sent into the nozzle through the slot; and the ratio of the slot area to the throat area is also of importance for the conversion of the added energy into propulsion energy in the nozzle exit. According to the invention I have found that for propulsion in air a ratio of slot area to throat area of between 1:3 and 1:12 must normally be used.

The nozzle according to the invention may be constructed with a circular, oval or rectangular cross-section or may have the form of a slot. According to the invention I have found it most advantageous that the nozzle has a rectangular cross-section, as in this case it can be constructed from single curved plates which greatly reduces the price of construction.

It is, as is previously stated, generally desired that the nozzle construction offers the smallest possible projected area in the direction of travel to give the lowest possible air resistance. This is generally achieved with the cross sectional form having the smallest possible circumference in relation to the cross sectional area, which, as is well-known, is the circle and for a rectangular cross-section, the square. For reasons of construction it is simultaneously desired to make the height of the nozzle as small as possible. According to the invention I have found that the best compromise between these two considerations for a nozzle with a rectangular cross-section is achieved at a ratio of the height of the nozzle to its width of about 4:7.

In an expedient embodiment of a nozzle according to the invention for use in air the pressurized air is fed to the pressure chamber from below and flows up through the side parts of the chamber to the top of said chamber, while excaping through the slot at the front of said pressure chamber. To ensure a constant volume flow through all parts of the slot the volume of the pressure chamber must be reduced corresponding to the air quantity passing the part of the chamber in question, so that the dynamic pressure is the same everywhere. In practice this is achieved by a stepwise narrowing of the pressure chamber so that it is broadest at the bottom, narrower along the sides and narrowest at the top of the nozzle.

It has proved possible to combine the above parameters for a nozzle according to the invention in such a way in a nozzle for use in propelling a hovercraft to be provided with two such nozzles that the pressurized air for the propelling nozzles can be supplied from two radial blowers of the same type as those supplying the air cushion. In this way a very simple embodiment of the hovercraft is achieved where the driving engine can produce the lift as well as propulsion merely by driving a number of blowers mounted on the same shaft.

Figure 2:
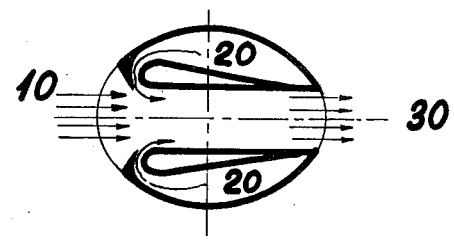
Figure 3:
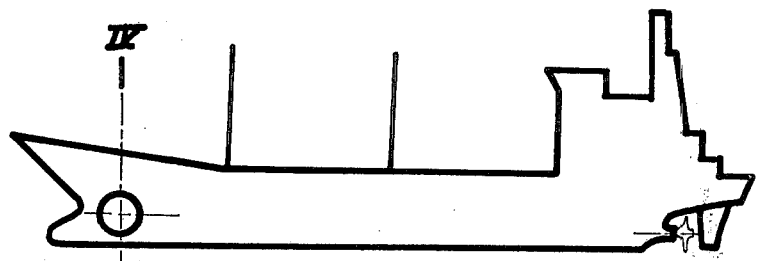
Figure 4:
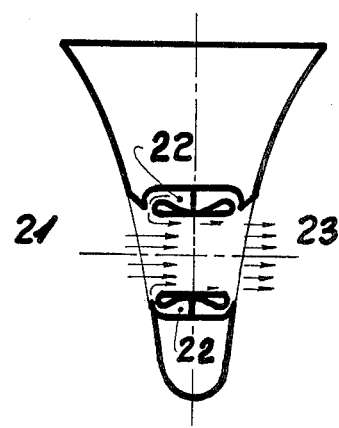
Figure 6:
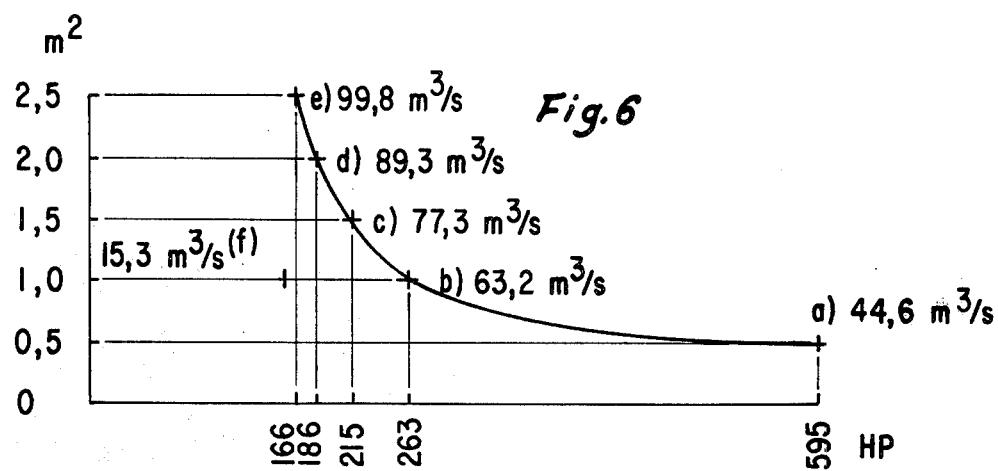
Figure 5:
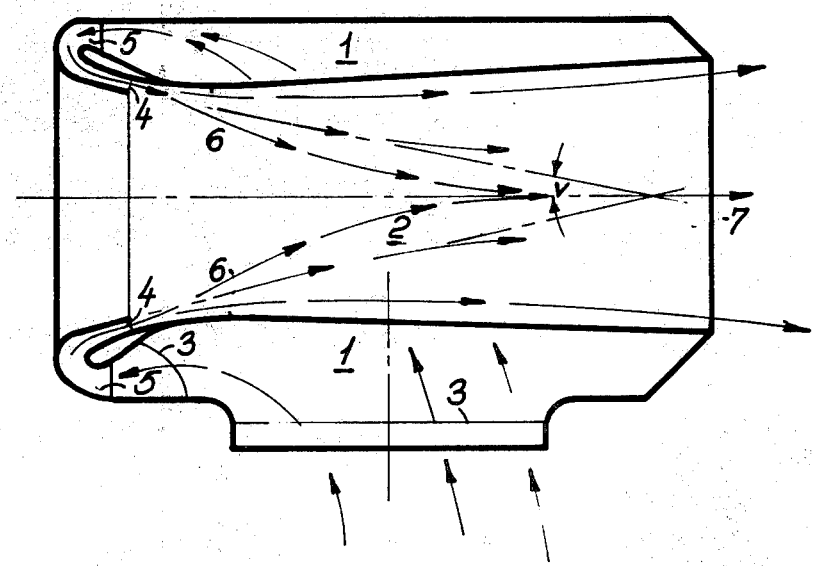
Figure 7:
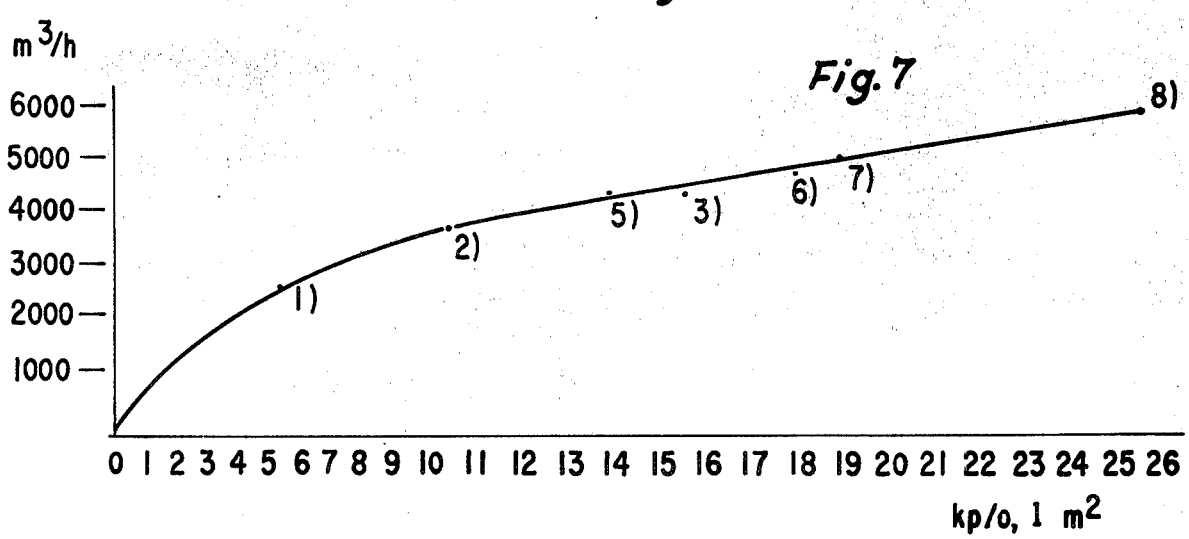

The drawing shows schematically three embodiments of the propelling nozzle according to the invention where FIG. 1 shows an aerodynamic embodiment, seen from the side, FIG. 2 the same embodiment according to the section II—II in FIG. 1, FIG. 3 shows a hydrodynamic embodiment, seen from the side, FIG. 4 the same embodiment according to the section IV—IV in FIG. 3, FIG. 5 shows a longitudinal, vertical section through a preferred embodiment, seen from the side, for use in a hovercraft, and FIG. 6 shows in Curve 1: Energy/area ratio at a static thrust of 250 kp-, and FIG. 7 shows in Curve 2: Functional diagram for thrust pressure and air quantity fed to 0.1 m² thrust nozzle.

FIGS. 1 and 2 show the propelling nozzle used for example for the propulsion and steering of an amphibian hovercraft. In FIG. 2 reference numeral 10 denotes air sucked in, reference numeral 20 denotes intake air with a pressure above the atmospheric pressure, and reference numeral 30 denotes the discharge air being the sum of the air quantities 10 and 20.

FIGS. 3 and 4 show an embodiment of the propelling nozzle used for manoeuvring of displacement craft. In FIG. 4 reference 21 denotes water sucked in, which in the shown situation flows from the left to the right, reference 22 denotes intake water at a higher pressure than the static pressure in the surrounding water, and reference 23 denotes discharge water being the sum of the water quantities references 21 and 22.

The nozzle shown in FIG. 5 has a rectangular cross-section and is constructed so as to have plane surfaces externally and single curved surfaces internally. As shown in the drawing the pressure air is blown from below up into the bottom of the pressure chamber 1, where in the centre along the nozzle an air distributing plate has been mounted which is cut off at the edges 3.

Air flows from the pressure chamber 1 out through the slot 4 arranged at an angle v=15° with the longitudinal direction of the nozzle. In the slot orifice guide plates 5 have been mounted parallel with the longitudinal direction of the nozzle at a mutual distance of 3 times the slot width. These guide plates ending at the front edge of the slot serve the purpose of ensuring an even outflow of the air and act at the same time as a bracing for the shell defining the slot.

The internal pipe 2 of the nozzle is narrowest at 6 (the throat) and has from there a tapering outwards in the direction of flow of $7\frac{1}{2}°$. The ratio of the overall slot area to the throat area is 1:4.12 in the shown nozzle. In the nozzle pipe the energy in the small volume flow ejected from the slot 4 at a great velocity is converted into energy in the big volume flow entrained in the interior of the pipe 2 and emitted from the thrust orifice 7 of the nozzle at a lower velocity.

Measurements on experimental mountings have proved a connection between the velocity of the jet flow, the radius of deflection, throat diameter and length of nozzle for the propelling nozzle of the invention. The pressure and velocity of the jet flow represent one energy level, and the pressure and velocity out of the nozzle represent another energy level. The ratio between these levels may exceed 0.9 which means in practice that we have a form of energy conversion with a very high efficiency. This also means that the nozzle is not an "energy waster," and furthermore, the dimensions of the propelling fan can be reduced corresponding to the ratio of the fed air quantity to the discharged air quantity. The latter ratio can be illustrated by a comparison with direct jet propulsion by means of centrifugal fans.

The maximum propelling pressure from the thrust orifices on a craft which is not in motion is termed "static thrust" $P_p$, and is determined as the specific air pressure in the orifice multiplied by the area of the orifice.

For an evaluation of the main data of the propelling system at direct thrust propulsion the following expressions are given:

(1) $P_p = p_r \cdot f$, where $p_r$ is the thrust pressure and f the orifice area;

(2) f is selected;

(3) $p_r = P_p/f$, where $p_r$ is set corresponding to the dynamic pressure $p_d$;

(4) air velocity in the orifice $$v_r = \sqrt{\frac{p_r \cdot 2g}{\gamma}} = \sqrt{p_r \cdot 15.95} \ ;$$

where $\gamma$ is the density of the air which at 20° C. is set at 1.23;

(5) quantity of air out of the orifice $Q=v_r f$;

(6) consumption of effect $N=(p_r Q)/(75 \cdot \eta)$, where $\eta$ is the efficiency of the blower set at 0.8.

With a decreasing cross-section of the area of the thrust orifice the effect consumption increases for the achievement of a given static thrust.

The orifice area is a primary construction quantity deciding the volume of flow, size of the blower and the effect requirements.

Selection of orifice area must therefore be made from the area/effect ratio, which can be illustrated by computing a number of examples with a constant static thrust at orifice areas from 0.5 m² to 2.5 m² with jumps of 0.5 m².

A constant static thrust $P_p=250$ kp will give:

| f | Q | N |
|---|---|---|
| 0.5 m² | 44.6 m³/s | 595 HP |
| 1.0 m² | 63.2 m³/s | 263 HP |
| 1.5 m² | 77.3 m³/s | 215 HP |
| 2.0 m² | 89.3 m³/s | 186 HP |
| 2.5 m² | 99.8 m³/s | 166 HP |

The ratio of energy requirements to orifice area at a given static thrust can accordingly be illustrated in curve 1 shown in FIG. 6 where the necessary volume flow is stated at each point.

As it will be seen the curve area for direct outflow around (e) is advantageous seen from an energy point of view, but as a volume flow of about 100 m³/s requires very big fans and nozzles the solution is constructionally disadvantageous.

The point (f) in curve 1 is the "working point" for a propelling nozzle according to the invention as described above in connection with the drawing and with a thrust orifice of 1 m². The values for this point is computed from a number of measurements on an experimental nozzle with a scale of 1:10 with a thrust orifice of 0.1 m² as shown in curve 2 (see FIG. 7).

It will be seen that for a static thrust of 25 kp (close to 8) a volume flow of 5500 m³/h=1.53 m³/s is required. For this a pressure of 440 mmWC is used, and when the efficiency of the blower is set at 0.8 an effect of 11.2 HP is required. As there is some spreading in the results it is assumed that in all cases less than 15 HP are to be used. A calculation into full scale will give the point (f) in curve 1, viz, that for the achievement of a static thrust of 250 kp a volume flow of 15.3 m³/s is required, and an effect not exceeding 150 HP.

Thus, it appears that the nozzle according to the invention with a lower effect requirement only requires about one sixth of the air quantity and two fifths of the orifice area required for the achievement of the same thrust pressure at direct blower propulsion.

What I claim is:

1. In a transport vehicle for use in air or on water, the new use of a propulsion nozzle comprising:
   (a) an internal surface;
   (b) a curved leading surface merging into said internal surface;
   (c) a narrowed throat in said internal surface located towards the said curved surface;
   (d) a jacket surrounding said internal surface;
   (e) an annular internal slot located in said internal surface between said curved surface and said narrowed throat and communicating with said jacket;
   (f) an inner edge of said slot not protruding inside the narrowest circumference of the throat;
   (g) means for supplying primary fluid under pressure through said slot; the slot being arranged at an acute angle of under 45°, to the direction of the exit flow so that the fluid is ejected tangentially to said curved leading edge and the fluid travels with greatest speed next to the internal surface, the fluid injected through the slot being the same as the medium through which the vehicle is being propelled.

2. Nozzle according to claim 1, characterized in that the fluid under pressure is ejected from the slot at an angle to the general direction of the exit flow of about 15°.

3. Nozzle according to claim 1, wherein the internal surface tapers outwardly towards the rear in the direction of flow at an angle of about $7\frac{1}{2}°$.

4. Nozzle according to claim 1, characterized in that the ratio of the overall slot area to the throat area is between 1:3 and 1:12.

5. Nozzle according to claim 1, characterized in that the nozzle has a rectangular cross-section.

6. Nozzle according to claim 1, characterized in that the ratio of the height to the width of the nozzle is about 4:7.

* * * * *